E. SMITH.
CARPET BEATER.
APPLICATION FILED JUNE 27, 1916.

1,198,160.

Patented Sept. 12, 1916.

WITNESSES
C. K. Reichenbach.
C. Bradway.

INVENTOR
Edward Smith
BY
ATTORNEYS

UNITED STATES PATENT OFFICE.

EDWARD SMITH, OF NEWARK, NEW JERSEY.

CARPET-BEATER.

1,198,160.　　　　　　Specification of Letters Patent.　　Patented Sept. 12, 1916.

Application filed June 27, 1916.　Serial No. 106,106.

*To all whom it may concern:*

Be it known that I, EDWARD SMITH, a citizen of the United States, and a resident of Newark, in the county of Essex and State of New Jersey, have invented a new and Improved Carpet-Beater, of which the following is a full, clear, and exact description.

This invention relates to a device for beating carpet while stretched on the grass or ground.

The invention has for its general objects to provide a carpet beater which is run back and forth over the carpet after the fashion of a roller or lawn mower to actuate the beating elements, whereby the dust is dislodged from the carpet, the device being comparatively simple and easy to operate, reliable and efficient in use and comparatively inexpensive to manufacture.

A more specific object of the invention is the provision of a device of the character referred to which includes a novel arrangement of beating elements actuated by a drum or cylinder which is provided with teeth so arranged as to periodically operate the beating elements as the device is wheeled over the carpet in a forward direction.

With such objects in view, and others which will appear as the description proceeds, the invention comprises various novel features of construction and arrangement of parts which will be set forth with particularity in the following description and claims appended hereto.

Figure 1:
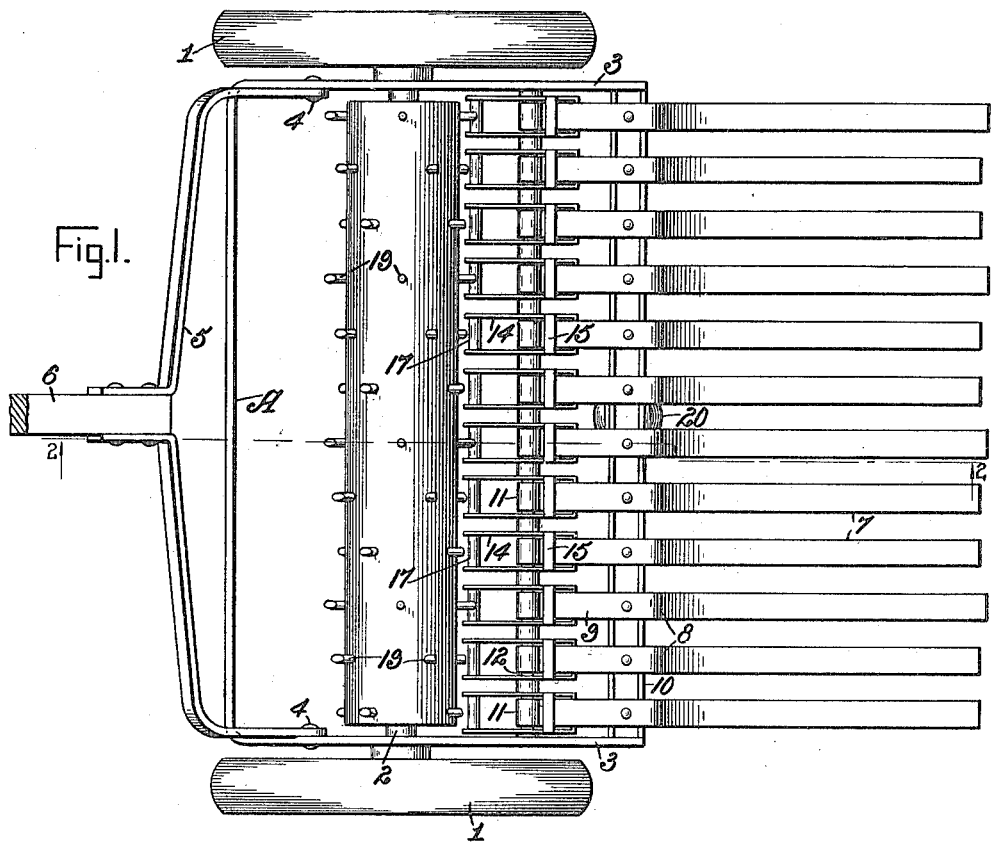
Figure 2:
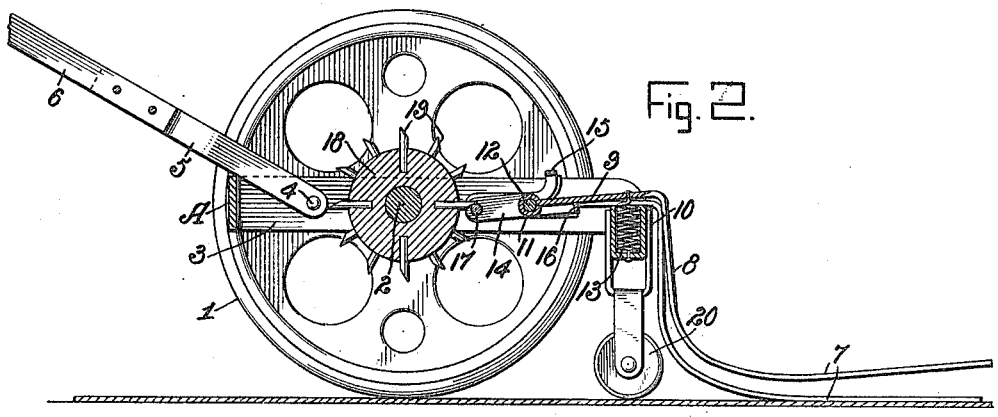

In the accompanying drawing, which illustrates one embodiment of the invention and wherein similar characters of reference indicate corresponding parts in both the views, Figure 1 is a plan view of the carpet beater; and Fig. 2 is a sectional view on the line 2—2, Fig. 1.

Referring to the drawing, 1 designates the main wheels which are fastened to an axle 2 journaled in the side members 3 of a rectangular frame A. This frame is connected at 4 with a yoke 5 of an operating handle 6.

At the front of the machine are a plurality of beating elements 7 in the form of forwardly extending arms disposed in a plane coincident with the bottoms of the wheels 1, so that as the device is moved over a carpet the members 7 will engage the latter. The members 7 have upwardly extending portions 8 at the rear which terminate in horizontal portions 9 extending over the front bar 10 of the frame A. The rear ends of the portions 9 of the beating elements are formed into eyes 11 which are disposed in alinement, and through which eyes passes a supporting or pivot rod 12 extending from one end to the other of the main frame and fastened thereto. By reason of this arrangement the beating elements swing upwardly and downwardly in their beating action. The upward movement of each beating element is yieldingly opposed by a spring 13 which is connected with the portion 9, as shown in Fig. 2 and with the front bar 10, and it is these springs that produce the downward or beating movement of the beating elements. Associated with each beating element is a lifter 14 in the form of a frame which embraces the rear end of the associated member 9 and which is pivoted on the rod 12. The frame 14 has upper and lower cross bars 15 and 16 extending respectively across the top and the bottom of each member 9, and the rear part of each frame is provided with a cross bar 17 which is engaged by suitable actuating means to cause the lifter 14 to raise its associated beating element. The actuating means for the lifters 14 comprises a drum or cylinder 18 fastened to the axle 2, and on this cylinder are suitably arranged teeth or cams 19 so that, as the cylinder rotates, these teeth will strike the lifters 14 and cause the latter to tilt, and these in turn raise the beating elements 7, and as soon as the pins pass the members 17 of the lifters 14, the beating elements will move downwardly. The teeth 19 are staggered around the cylinder so that the beating elements are not all actuated at the same instant, but they operate in groups successively. The device is pushed forwardly over the carpet to produce a beating action of the elements 7, but the device can be moved rearwardly without, however, producing any beating action because the teeth 19 move freely past the lifters.

To assist in the proper positioning of the frame the latter may have a small roller 20 located behind the carpet-engaging portions of the beating elements, such roller being fastened to the center of the front bar 10 of the frame.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A carpet beating device of the class described, comprising a wheel-supported body, a rod extending across the body, beaters pivoted on the rod, lifters pivoted on the rod and having forwardly and rearwardly extending members, a rotatable actuator arranged to engage the rear members of the lifters, the forward members being arranged in pairs disposed respectively above and below the beaters, and a spring connected with each beater for moving the same downwardly on its beating stroke.

2. A carpet beating device of the class described comprising a body, wheels supporting the same, a toothed element connected with the wheels to be rotated thereby and mounted on the body, a plurality of lifters all arranged in a line and in coöperative relation with the toothed element for actuation thereby, a fulcrum member extending through all the lifters at points intermediate the ends thereof, pivoted beating elements mounted on the body and extending forwardly therefrom, there being a beating element for each lifter and the forward portion of the latter engaging with its associated beater, and a spring connected with each beating element for moving the same on its beating stroke.

EDWARD SMITH.

Copies of this patent may be obtained for five cents each, by addressing the "Commissioner of Patents, Washington, D. C."